United States Patent
Allenic et al.

(10) Patent No.: US 9,246,434 B2
(45) Date of Patent: Jan. 26, 2016

(54) SYSTEM AND METHOD FOR ESTIMATING THE SHORT CIRCUIT CURRENT OF A SOLAR DEVICE

(75) Inventors: Arnold Allenic, Ann Arbor, MI (US); Oleh Petro Karpenko, Richmond, CA (US)

(73) Assignee: FIRST SOLAR, INC, Perrysburg, OH (US)

(*) Notice: Subject to any disclaimer, the term of this patent is extended or adjusted under 35 U.S.C. 154(b) by 479 days.

(21) Appl. No.: 13/612,591

(22) Filed: Sep. 12, 2012

(65) Prior Publication Data

US 2013/0076367 A1 Mar. 28, 2013

Related U.S. Application Data

(60) Provisional application No. 61/539,322, filed on Sep. 26, 2011.

(51) Int. Cl.
*G01R 31/26* (2014.01)
*G01R 19/00* (2006.01)
*H01L 31/02* (2006.01)
*H02S 50/10* (2014.01)

(52) U.S. Cl.
CPC .................................... *H02S 50/10* (2014.12)

(58) Field of Classification Search
CPC ... Y02E 10/50; Y02E 10/549; H01L 51/4253; H01L 31/022425; H01L 31/02021; H01L 31/055; G01R 31/2605; G01R 31/26; G01R 19/00; G01J 3/50
USPC ......... 324/761.01, 426, 501, 750.3, 750, 761; 136/252; 257/40, 48; 438/94, 460, 47, 438/48
See application file for complete search history.

(56) References Cited

U.S. PATENT DOCUMENTS

| | | | |
|---|---|---|---|
| 4,205,265 A | 5/1980 | Staebler | |
| 5,223,043 A | 6/1993 | Olson et al. | |
| 6,169,414 B1 | 1/2001 | Yoshino et al. | |
| 6,541,754 B2 | 4/2003 | Matsuyama | |
| 7,733,111 B1 * | 6/2010 | Zhao et al. | 324/761.01 |
| 8,076,571 B2 * | 12/2011 | den Boer | H01L 31/02168 136/265 |
| 2009/0234601 A1 | 9/2009 | Wu et al. | |
| 2010/0013665 A1 | 1/2010 | Choy et al. | |
| 2010/0229935 A1 * | 9/2010 | Sakai | H01L 31/022466 136/256 |
| 2010/0243056 A1 | 9/2010 | Korevaar et al. | |
| 2010/0275982 A1 * | 11/2010 | Abbott et al. | 136/255 |

(Continued)

FOREIGN PATENT DOCUMENTS

| | | |
|---|---|---|
| CN | 101311742 A | 11/2008 |
| DE | 10305662 A1 | 9/2004 |

(Continued)

*Primary Examiner* — Tung X Nguyen
*Assistant Examiner* — Neel Shah
(74) *Attorney, Agent, or Firm* — Dickstein Shapiro LLP

(57) ABSTRACT

Described herein is a method and system for determining a short-circuit current of a solar device before the solar device is tested in a solar simulator. A solar device includes a substrate layer, a front contact layer, a window/emitter layer, an absorber layer and a back contact. A thickness of the window/emitter layer and an absorption wavelength of the absorber layer are determined. The window/emitter layer thickness and absorber layer absorption wavelength are used with a fitting parameter that corresponds to transmission properties of the substrate and first contact layers in order to determine the solar device's short-circuit current.

22 Claims, 7 Drawing Sheets

(56) References Cited

U.S. PATENT DOCUMENTS

| | | |
|---|---|---|
| 2011/0025839 A1 | 2/2011 | Trupke et al. |
| 2011/0082600 A1 | 4/2011 | Capel |
| 2011/0155207 A1* | 6/2011 | Singh .......................... 136/244 |

FOREIGN PATENT DOCUMENTS

| | | |
|---|---|---|
| DE | 10 2009 039 399 A1 | 3/2011 |
| JP | 63181015 A | 7/1988 |
| JP | 9275219 A | 10/1997 |
| JP | 2004281480 A | 10/2004 |
| JP | 2004281706 A | 10/2004 |
| JP | 2005011958 A | 1/2005 |
| JP | 2010219349 A | 9/2010 |
| WO | WO-2010/019992 A1 | 2/2010 |
| WO | WO-2010/129559 A2 | 11/2010 |
| WO | WO 2011/114835 A1 | 9/2011 |

* cited by examiner

SYSTEM AND METHOD FOR ESTIMATING THE SHORT CIRCUIT CURRENT OF A SOLAR DEVICE

CROSS-REFERENCE TO RELATED APPLICATION

The present application claims priority to Provisional Application No. 61/539,322 filed Sep. 26, 2011, the entirety of which is incorporated by reference.

FIELD OF THE INVENTION

The disclosed embodiments relate to photovoltaic (PV) devices, such as PV cells and PV modules, and methods of testing the same.

BACKGROUND OF THE INVENTION

PV devices convert sunlight into electricity via a physical process called "photovoltaic effect." Specifically, sunlight is composed of photons, or "packets" of energy. The photons contain various amounts of energy corresponding to different wavelengths of light Upon striking a PV device, a photon may be reflected, absorbed, or pass right through the device. When a photon is absorbed, the energy of the photon is transferred to an electron in an atom of a semiconductor within the PV device. With its newfound energy, the electron is able to escape from its normal position associated with that atom. By leaving this position, the electron causes a hole to form. Electrons and holes thus formed are collected each by one of two separate electrodes. The PV device can then be used to power an external electrical device using the two electrodes.

Different parameters can be used to evaluate a PV device's efficiency. Among these parameters is the device's short-circuit conductance $G_{SC}$. The $G_{SC}$ is used to evaluate the amount of electrical loss caused by the device's shunt resistance. The greater the $G_{SC}$, the more shunted the device and the less power that the device can produce.

As will be explained later, the $G_{SC}$ of a PV device is related to the device's short-circuit current $I_{SC}$, which is the current through the device when the voltage through the device is zero. Thus, knowing the $I_{SC}$ of a PV device, its $G_{SC}$ can easily be determined.

Traditionally, a simulator is used to determine the $I_{SC}$ of a PV device. This usually occurs after the device has been manufactured and during a simulation stage. However, due to limitations in simulators, the determined $I_{SC}$ and thus the $G_{SC}$ of a PV device are not always accurate. Therefore, methods and systems are desired for more accurately determining the $I_{SC}$ and $G_{SC}$ of a PV device.

DETAILED DESCRIPTION OF THE INVENTION

In the following detailed description, reference is made to the accompanying drawings, which form a part hereof, and in which is shown by way of illustration specific embodiments that may be practiced. It should be understood that like reference numbers represent like elements throughout the drawings. Embodiments are described with sufficient detail to enable those skilled in the art to practice them. It is to be understood that other embodiments may be employed, and that various structural, logical, and electrical changes may be made without departing from the spirit or scope of the invention.

Figure 1A:
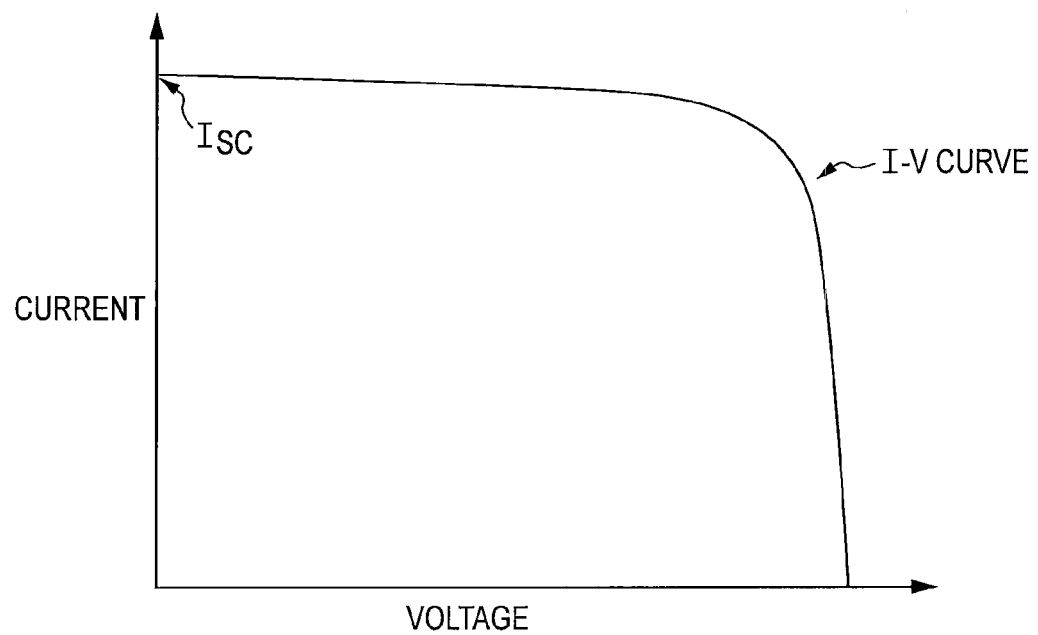
FIG. 1A is an I-V curve for a solar device.

As noted above, a PV device, whether a cell or a module (note that a module is made of a plurality of cells interconnected in series, in parallel or a combination thereof), has both a $G_{SC}$ and an $I_{SC}$. Typically, both the $G_{SC}$ and $I_{SC}$ are determined from the device's current-voltage or I-V curve, which is itself normally obtained through simulation of the device after the device has been assembled or manufactured. For example, to obtain the I-V curve, a solar simulator is used to bias the PV device at various voltages (using pulses of light) and to measure the resulting current at the biased voltages. An exemplary I-V curve of a PV device is illustrated in FIG. 1A. Note that since a PV module is made of a plurality of PV cells, the I-V curve for a solar cell can be correlated to the I-V curve for the cell's solar module through a linear relationship. Thus, an I-V curve for a solar cell differs from the I-V curve for a solar module in scale and upper voltage and current limits.

Once the I-V curve is constructed, the $I_{SC}$ can be easily determined as the point on the I-V curve for which the voltage bias is zero. The $G_{SC}$ is the slope of a tangential line to the $I_{SC}$ point on the I-V curve.

Figure 1B:
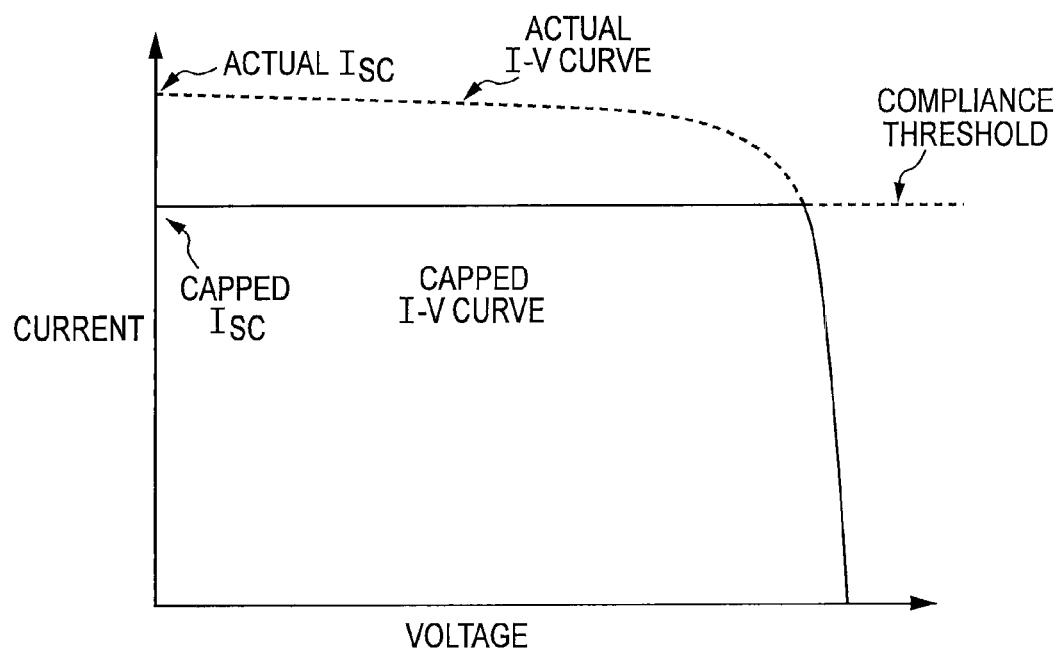
FIG. 1B is a capped I-V curve for a solar device.

However, most solar simulators, including those used on a module level, have a range of current over which their load regulation is within specified limits. This is known as the current compliance range. If the current measured under a certain voltage falls outside of that range, the simulator will only report the highest value of the range, if the measured current is higher than the highest value of the range, or the lowest value of the range if the measured current is lower than the lowest value of the range. This is illustrated in FIG. 1B where capped $I_{SC}$ indicates the maximum current value of the simulator's current compliance range and actual $I_{SC}$ indicates the true $I_{SC}$ of the device, which is higher than the capped $I_{SC}$. In this case, the simulator inaccurately indicates the capped $I_{SC}$ as the $I_{SC}$ of the device. This inaccuracy in the I-V curve leads to inaccuracies in the determination of the device's $I_{SC}$ and $G_{SC}$. To solve this problem, methods and systems are disclosed herein for the determination of a device's $I_{SC}$ before the device is subjected to a simulator so that the simulator's compliance can be adjusted on-the-fly and thus the device's correct I-V curve can be determined.

In an embodiment, a solar device's short-circuit current Isc can be determined during manufacturing and before the solar device is in a condition to be tested in a solar simulator. This is accomplished, in part, by determining various characteristics of different layers of the solar device.

Figure 2:
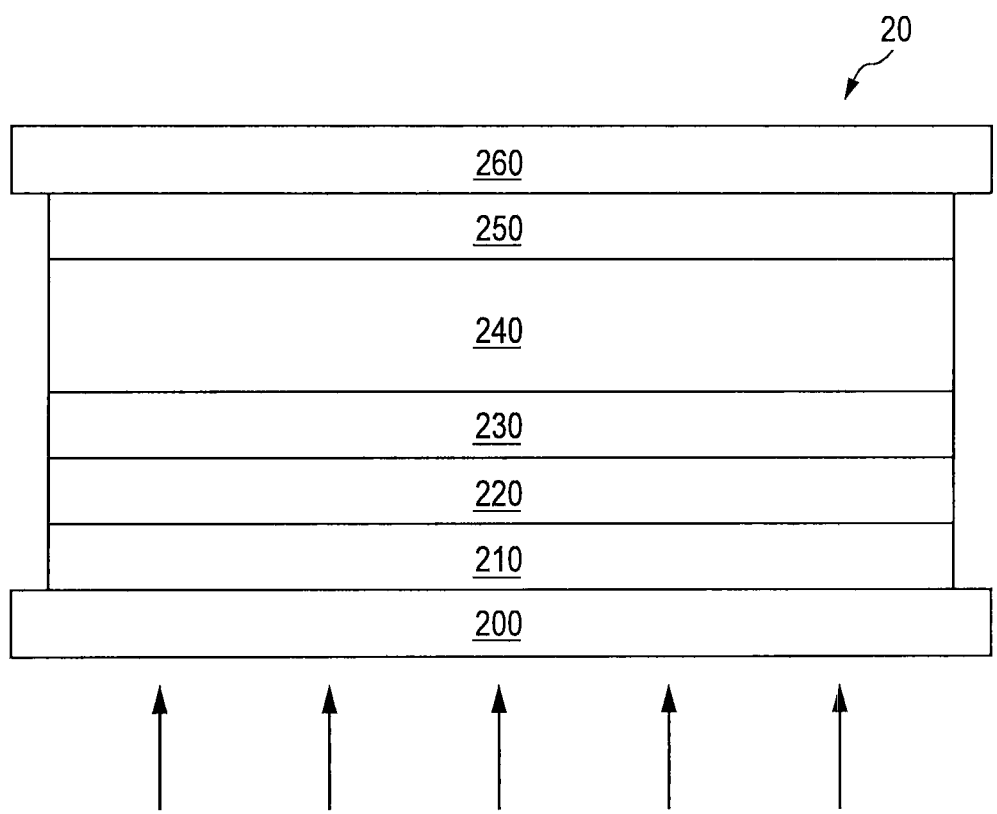
FIG. 2 is a cross-sectional view of a solar device having multiple layers.

As is illustrated in the example of FIG. 2, a solar device 20 is made up of many different layers of material. The layers illustrated in solar device 20 are representative of layers found in both solar cells and solar modules. While specific types of solar devices may include additional layers and components (such as, for example, scribe lines in a solar module), the layers illustrated in FIG. 2 are generally found in most PV devices. The solar device 20 generally includes a front side substrate 200, which receives incident radiation when in use. Substrate 200 may be glass, for example, soda-lime glass. A front contact 210 is formed next to the substrate 200. Front contact 210 can be a transparent conductive oxide ("TCO") layer, and can be, for example, a tin oxide layer or a tin oxide layer doped with fluorine. The front contact 210 is an electrical contact and is used with a back contact 250 to provide an electrical connection between the semiconductor layers, as described below, and an external electrical load. A tin dioxide buffer layer 220 is formed next to the front contact 210 and acts as an intermediary between the front contact 210 and the device's semiconductor layers, improving both structural integrity and energy efficiency of the device. A window/emitter layer 230, which is a semiconductor layer, is formed next to the buffer layer 220. An absorber layer 240, which is also a semiconductor layer, is formed adjacent the window/emitter layer 230. The semiconductor window/emitter layer 230 allows the penetration of solar radiation to the absorber layer 240, which converts solar energy to electricity. The window/emitter layer 230 and absorber layer 240 can include, for example, a binary semiconductor such as group II-VI or III-V semiconductors, such as, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InS, InN, InP, InAs, InSb, TlN, TlP, TlAs, TlSb, or mixtures thereof. An example of a window/emitter layer 230 and absorber layer 240 can be a layer of CdS and a layer of CdTe, respectively. The window/emitter layer 230 is thinner than the absorber layer 240. A thinner window/emitter layer 230 allows greater penetration of the shorter wavelengths of incident light to the absorber layer 240. The back contact 250 which, as mentioned above, is a conductor is formed next to the absorber layer 240. The back contact 250 is used with the front contact 210 to bridge the electrical connection between the semiconductor layers and an external electrical load. A back support 260 is formed adjacent the back contact 250 for purposes of providing structural integrity.

Both the thickness of the window/emitter layer 230 and the absorption wavelength of the absorber layer 240 can be used in determining the short-circuit current Isc of the solar device 20. Additionally, a fitting parameter is determined that accounts for the transmissive properties of the substrate 200 and front contact 210. As explained below, the fitting parameter can be determined for various combinations of substrate 200/front contact 210. The various fitting parameters are then stored and applied whenever solar devices with corresponding substrate 200/front contact 210 combinations are manufactured. The thickness of the window/emitter layer 230 and the absorption wavelength of the absorber layer 240 can be determined during manufacture of the solar devices, after the absorber layer 240 has been annealed (a manufacturing step wherein one or more of the transparent layers in the solar devices are heat-treated in order to form a more crystalline structure, thus improving the device's conductivity and transparency) and before the back contact 250 and back support 260 are formed. If solar device 20 is a solar module, the thickness of the window/emitter layer 230 and the absorption wavelength of the absorber layer 240 can be determined either before or after the isolation of individual cells via, for example, laser scribing. Thus, the solar device's short-circuit current Isc can be determined several hours before the solar device 20 is ready to be tested using a solar simulator.

The short-circuit current Isc of a solar module is determined according to equation 1, below, where BE is the absorption wavelength of the absorber layer 240, Tcds is the thickness of the window/emitter layer 230, d is the fitting parameter that describes the offset necessary to account for variations in transparency and/or reflection in the substrate 200 and the front contact 210, and a, b and c are coefficients with units of A/nm, A/nm and A/nm$^2$, respectively. In general, coefficient a is much greater than coefficient b, meaning that the absorption wavelength BE has more weight in the determination of the short-circuit current Isc than the thickness Tcds of the window/emitter layer 230. Also, coefficient c is generally much smaller than 1, meaning that there is little interaction between the absorption wavelength BE and the thickness Tcds parameters. As noted above, the short-circuit current Isc of a solar cell within the solar module is linearly related to the result produced by equation 1 for a solar module.

$$Isc = a \times BE + b \times Tcds + c \times Tcds \times BE + d \qquad \text{Equation 1.}$$

The fitting parameter d is essentially an offset to account for the transmissive properties of the substrate 200 and front contact (TCO layer) 210. Variations in the substrate 200 and front contact 210 can result in either higher transparency or reduced reflection losses. For example, an anti-reflective ("AR") coating applied to either the substrate 200 or the front contact 210 could result in reduced reflection losses. Changes in the composition of the glass substrate 200 can improve its transparency. Therefore, for each substrate 200/front contact 210 combination, a parameter can be determined that indicates the effect of the transmissive properties of the combination. A method for determining this fitting parameter for a known substrate 200 and front contact 210 combination is described below.

The fitting parameter d is determined through a combination of measurements and applications of equation 1. In order to determine the fitting parameter d for a given combination of substrate 200 and front contact 210, two zero-CdS devices with the same substrate 200/front contract 210 combination are manufactured and tested. A zero-CdS device is a solar device without any window/emitter layer 230 (or CdS layer). The zero-CdS devices must have different absorption wavelengths for their respective absorber layers 240 and the same substrate 200/front contact 210 combination in order to be useful in determining the fitting parameter d for the applied combination of substrate 200 and front contact 210. Because the zero-CdS devices have no window/emitter layer 230, the thickness Tcds of the window/emitter layer 230 is zero for zero-CdS devices. Therefore, equation 1 for a zero-CdS device may be rewritten as shown in equation 2.

$$Isc = a \times BE + d \qquad \text{Equation 2.}$$

Preferably, the two zero-CdS devices have absorption wavelengths that are significantly different; one should have a high absorption wavelength and the other should have a low absorption wavelength. Both zero-CdS devices may be tested during their manufacture to determine their respective absorption wavelengths using, for example, techniques described below. Also, after manufacturing, the zero-CdS devices may be subjected to a solar simulator to determine their respective short-circuit currents Isc. Any errors in the determined short-circuit currents Isc can be minimized by using a feedback loop to measure and re-measure the zero-CdS devices. In other words, a first short-circuit current Isc may be determined for a zero-CdS device using a simulator, and then the compliance of the simulator may be adjusted and the zero-CdS device may be tested again to determine a second short-circuit current Isc. If the determined short-circuit currents Isc are the same, then it is probable that the determined short-circuit currents Isc are accurate. Once each zero-CdS device's short circuit current Isc and absorption wavelength BE is determined, equation 2 may be used twice, once for each BE, to simultaneously solve for coefficient a and fitting parameter d.

Because fitting parameter d is specific to the substrate 200/front contact 210 combination used in a solar device 20, a fitting parameter d must be determined for each possible substrate 200/front contact 210 combination expected to be manufactured. The determined fitting parameters may be stored in a database or lookup table, for example, and then applied in equation 1 during the manufacture of a solar device that includes a corresponding substrate 200/front contact 210 combination.

Figure 3:
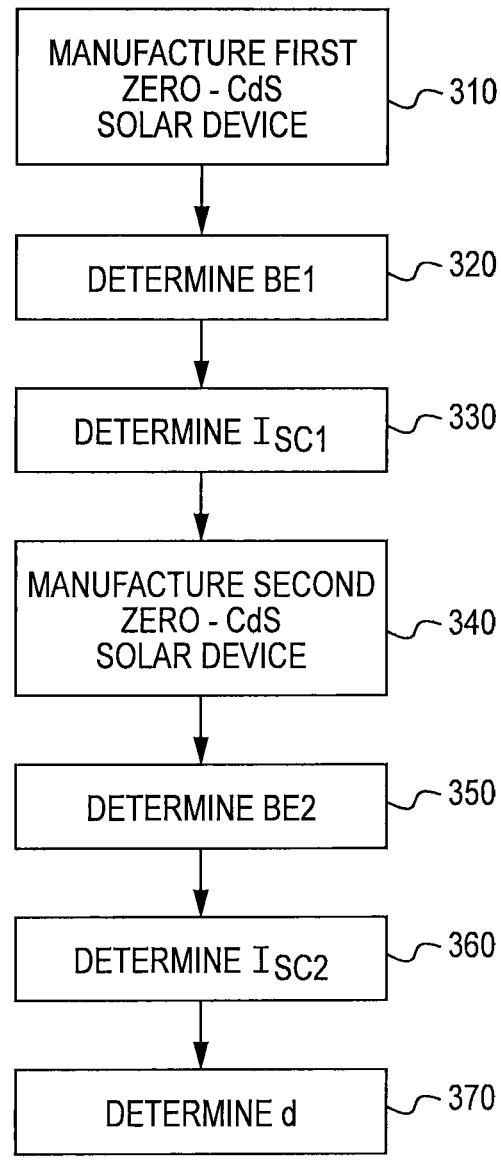
FIG. 3 illustrates a process of determining a solar device's fitting parameter in accordance with the present disclosure.

A process 300 for determining a solar device's fitting parameter is outlined in FIG. 3. At step 310, a first zero-CdS solar device is manufactured with a known substrate 200/front contact 210 combination and an absorber layer 240 having a first absorption wavelength BE1. At step 320, the absorption wavelength BE1 of the first zero-CdS solar device is determined. The absorption wavelength BE1 may be determined using, for example, the method explained below. At step 330, the completed first zero-CdS solar device is subjected to a solar simulator which is used to determine the first zero-CdS solar device's short-circuit current Isc1. At step 340, a second zero-CdS solar device is manufactured with the same known substrate 200/front contact 210 combination and an absorber layer 240 having a second absorption wavelength BE2. Preferably, the first and second absorption wavelengths BE1, BE2 are significantly different from each other, with one of the absorption wavelengths being a high absorption wavelength and the other being a low absorption wavelength. At step 350, the absorption wavelength BE2 of the second zero-CdS solar device is determined using the same method that was used to determine the absorption wavelength BE1 of the first zero-CdS solar device. At step 360, the completed second zero-CdS solar device is subjected to a solar simulator, which is used to determine the second zero-CdS solar device's short-circuit current Isc2. At step 370, equation 2 is used with the first and second absorption wavelengths BE1, BE2 and the first and second short-circuit currents Isc1, Isc2 to determine the fitting parameter d that corresponds with the known substrate 200/front contact 210 combination. Process 300 is repeated for different known substrate 200/front contact 210 combinations.

In addition to determining a fitting parameter for a solar device 20, the window/emitter layer 230 thickness Tcds and the absorber layer 240 absorption wavelength BE must also be determined for each solar device. The window/emitter layer 230 thickness Tcds is determined by analyzing the amount of light of a given wavelength that passes through the solar device before the back contact 250 and back support 260 have been formed. The wavelength of the light used must be smaller than the band gap of the window/emitter layer 230. For example, when the window/emitter layer 230 is made of CdS, blue light with a wavelength from 450 to 550 nm may be used. Thus, a blue light illuminator may be used to illuminate a solar device 20. At these wavelengths, the light is absorbed primarily at the CdS layer instead of at the absorber layer 240. While some of the blue light is absorbed by the window/emitter layer 230, some blue light will still pass through the window/emitter layer 230 and be detected by a detector located opposite the illuminator (with the solar device 20 located between the illuminator and the detector). The amount of blue light sensed at the detector is closely related to the thickness Tcds of the window/emitter layer 230. The relationship can be quantified in a lookup table determined through test measurements, for example.

Similarly, the absorption wavelength BE of the absorber layer 240 can be determined by finding the wavelength of light which is least absorbed as it passes through the uncompleted solar device 20 (without the back contact 250 and the back support 260). This can be determined by using an illuminator and illuminating the uncompleted solar device with different frequencies of light. A detector may be used opposite the illuminator so that the uncompleted solar device is located therebetween. The detector is used to determine a transparency value that corresponds with each illuminated frequency. The detected transparency values are plotted against their respective wavelengths in a transparency versus wavelength curve. The absorption wavelength BE is determined as the x-axis intercept of a tangent line to the transparency-wavelength curve at a point where the second derivative of the transparency-wavelength curve equals zero (i.e., the point where the transparency-wavelength curve has the steepest slope).

Other methods for determining the thickness Tcds and absorption wavelength BE may be used. Other methods may include the use of equipment, machinery or tools designed for this purpose.

Figure 4:
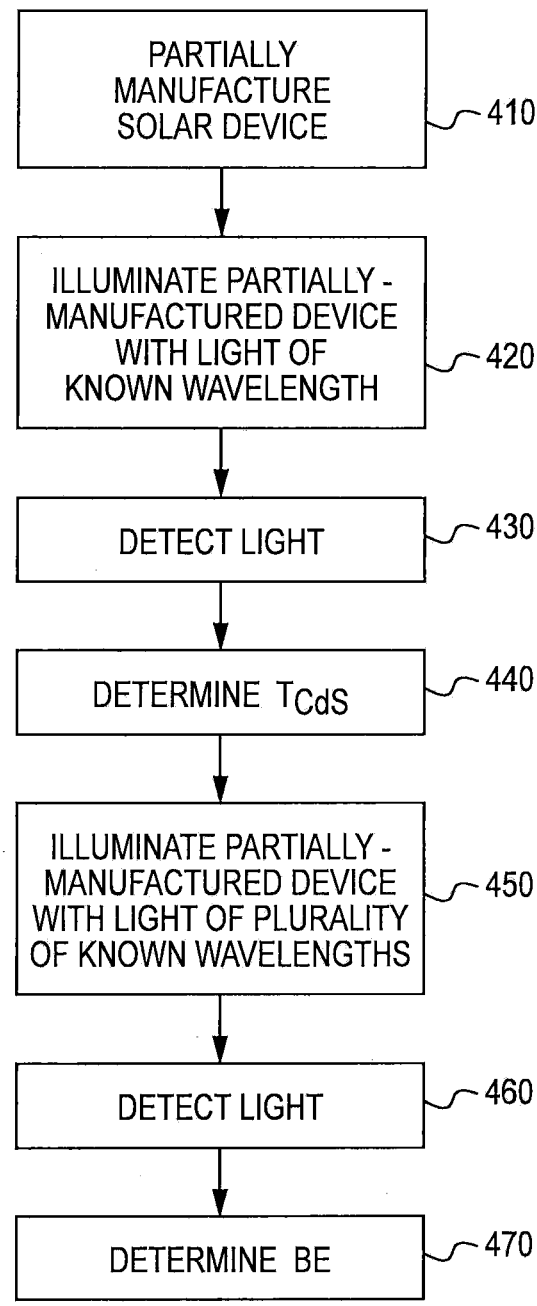
FIG. 4 illustrates a process of determining a solar device's window/emitter layer thickness and absorber layer absorption wavelength in accordance with the present disclosure.

A process 400 for determining a solar device's window/emitter layer 230 thickness Tcds and absorber layer 240 absorption wavelength BE is outlined in FIG. 4. At step 410, a solar device with a known substrate 200/front contact 210 is partially manufactured so as to include at least a substrate 200, a front contact 210, a window/emitter layer 230 and an absorber layer 240. Importantly, the partially-manufactured device does not yet include a back contact 250 or back support 260. Generally, in a front-to-back manufacturing process, this means that the partially-manufactured device has been manufactured up to the formation and annealing of the absorber layer 240. At step 420, the partially-manufactured solar device is illuminated using short-wavelength light such as blue light in the range of 450 to 550 nm. Some of the irradiated blue light is absorbed by the window/emitter (CdS) layer 230, while some passes through the partially-manufactured device. At step 430, a detector placed on the opposite side of the partially-manufactured device as the illuminator detects the light that passes through the partially-manufactured device. At step 440, the amount of detected light is used to determine the thickness of the window/emitter layer 230. The amount of detected light is compared with the amount of light used to illuminate the device. A ratio or percentage is determined which represents the transmission properties of the device's window/emitter layer 230 with respect to the wavelength of the irradiated light. A known relationship between the thickness of a CdS layer and the layer's ability to transmit light of a known frequency is used, for example, via a lookup table or database, to determine the thickness of the window/emitter layer 230.

At step 450, the partially-manufactured device is again illuminated by light of varying frequencies or wavelengths. In some embodiments, step 450 may be combined with step 420. At step 460, a detector located on the opposite side of the partially-manufactured device detects the light that passes through the device. A ratio or percentage is determined for each wavelength which represents the transmission properties of the device's absorber layer 240 with respect to each of the wavelengths of the irradiated light. In some embodiments, step 460 may be combined with step 430. At step 470, the determined ratios or transparency values are plotted against their respective wavelengths in a transparency versus wavelength curve from which the absorption wavelength BE of the absorber layer 240 is determined. The absorption wavelength BE is determined as the x-axis intercept of a tangent line to the transparency-wavelength curve at a point where the second derivative of the transparency-wavelength curve equals zero (i.e., the point where the transparency-wavelength curve has the steepest slope).

Thus, for solar devices 20 with a substrate 200/front contact 210 combination for which the fitting parameter d is known, a short-circuit current Isc can be determined for each device during the manufacturing of the device. The window/emitter 230 thickness Tcds is measured during manufacture. The absorption wavelength BE of the absorber layer 240 is also measured during manufacture. The fitting parameter d is selected from fitting parameters previously determined for specific substrate 200/front contact 210 combinations. Finally, coefficients a, b and c can be determined through experimentation and curve-fitting algorithms.

Figure 5:
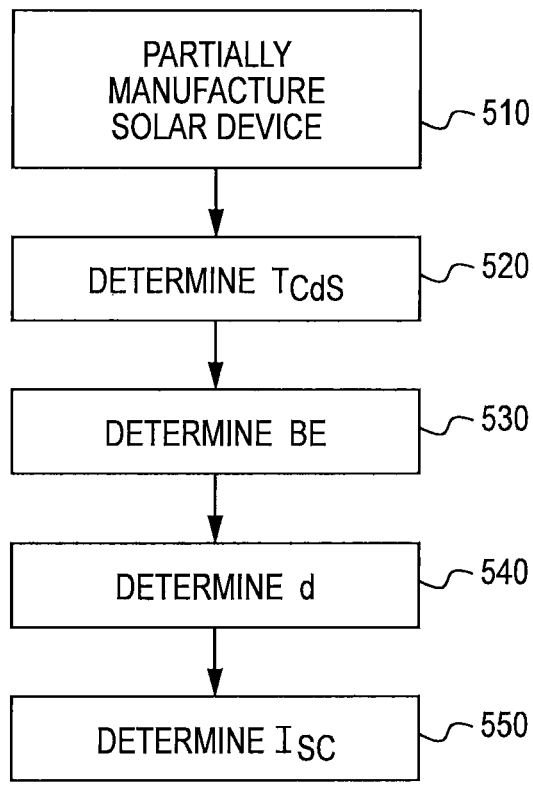
FIG. 5 illustrates a process of determining a solar device's short-circuit current in accordance with the present disclosure.

FIG. 5 illustrates a process 500 of determining a solar device's short-circuit current prior to the solar device's testing in a solar simulator. The process 500 may be used for solar device's manufactured using either a front-to-back process or a back-to-front process. At step 510, a solar device is partially manufactured to include at least a window/emitter layer 230 and an absorber layer 240. In a front-to-back process, the partially-manufactured solar device includes at least a substrate 200, a front contact 210, a window/emitter layer 230 and an absorber layer 240, but not a back contact 250 or back support 260. Generally, in a front-to-back manufacturing process, this means that the partially-manufactured device has been manufactured up to the formation and annealing of the absorber layer 240. In a back-to-front process, the partially-manufactured solar device includes at least a back support 260, a back contact 250, an absorber layer 240 and a window/emitter layer 230. In a back-to-front manufacturing process, a front contact 210 and substrate 200 may also be included, if desired, but need not be at this stage (step 510) of process 500.

At step 520, the thickness Tcds of the device's window/emitter layer 230 is determined. In a front-to-back manufacturing process, the thickness Tcds of the device's window/emitter layer 230 is determined using, for example, the method explained above. In other words, the device's window/emitter layer 230 is illuminated and the amount of transmitted light is detected. In a back-to-front manufacturing process, transmitted light cannot be measured. Because the back contact 250 is generally not transmissive to light, the light that is measured is light that is transmitted through the transparent layers of the device and then reflected back by the non-transparent layers such as the back contact 250. Thus, in a back-to-front manufacturing process, the solar device is illuminated using light of a known wavelength between 450 and 550 nm and the light that is reflected back is detected and measured. The measured light is correlated to a thickness Tcds of the window/emitter layer 230 after accounting for various factors such as reflection angle and reflection coefficients of each reflection interface.

At step 530, the absorption wavelength BE of the device's absorber layer 240 is determined using, for example, the method explained above (i.e., measuring an amount of transmitted light) or the back-to-front process (i.e., measuring an amount of reflected light). At step 540, a fitting parameter d corresponding to the device's substrate 200/front contact 210 combination is determined (through, for example, reference to a lookup table which includes previously determined fitting parameters). Steps 520, 530 and 540 may be performed in any order and are not limited to the order presented in FIG. 5. At step 550, the device's window/emitter layer 230 thickness Tcds, absorber layer 240 absorption wavelength BE and fitting parameter d are applied to equation 1 to determine the device's short-circuit current Isc.

When manufacture of the solar device is completed, the solar device will be subjected to testing in a solar simulator. Using the short-circuit current Isc determined during manufacture of the solar device, the compliance of the simulator may be adjusted as necessary in order to account for short-circuit currents that are in excess of the simulator's compliance. In this way, the I-V curve generated by the simulator is not subject to capping and an accurate short-circuit conductance Gsc may be determined.

Figure 6A:
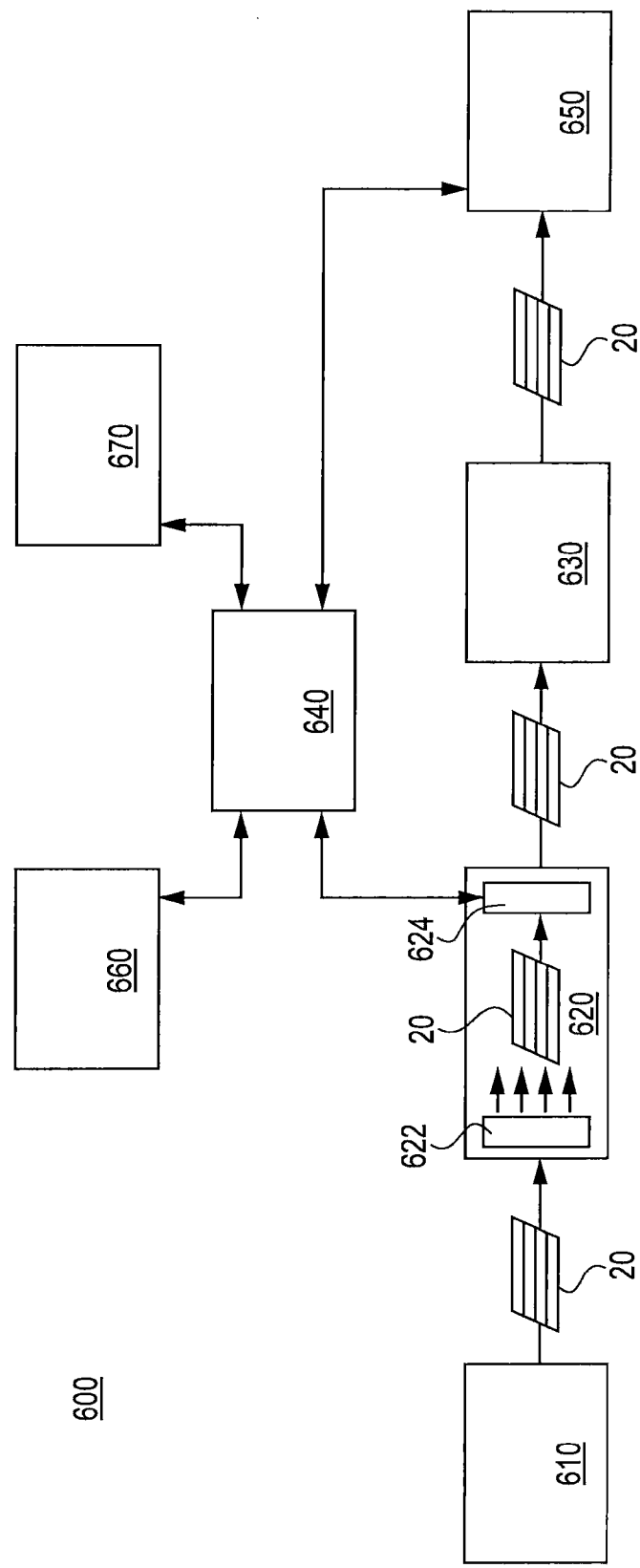
FIGS. 6A and 6B illustrate systems for determining a solar device's short-circuit current in accordance with the present disclosure.
Figure 6B:
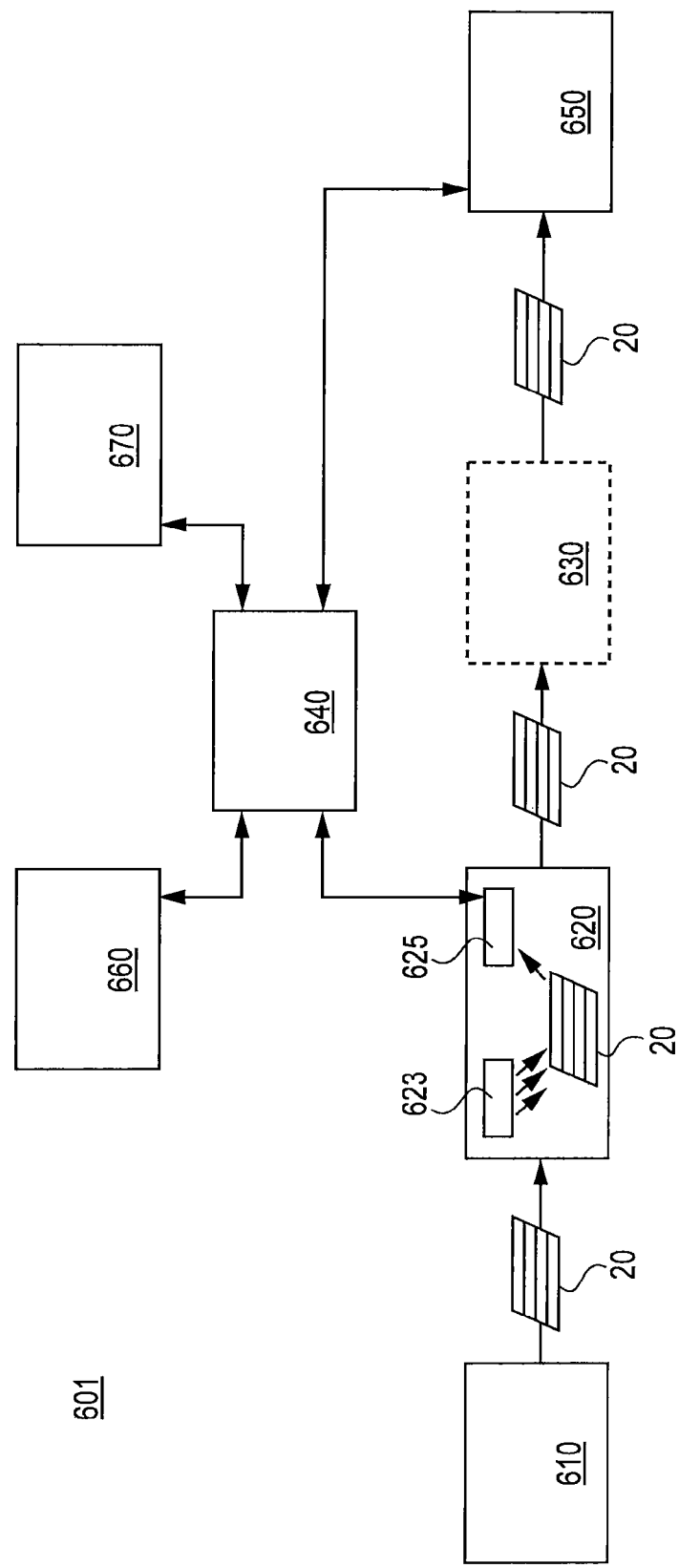

FIGS. 6A and 6B illustrate testing systems 600, 601 in accordance with the present disclosure. Testing system 600 is for use with front-to-back manufacturing processes while testing system 601 is for use with back-to-front manufacturing processes. The testing systems 600, 601 each include a first solar device assembly facility 610, a measurement chamber 620, a processor 640 and a solar simulator 650. A second solar device assembly facility 630 is also included in testing system 600 and may be included in testing system 601. A solar device 20 to be manufactured and tested is partially manufactured in the first solar device assembly facility 610. The partial manufacture process includes manufacturing a solar device 20 with at least a window/emitter layer and an absorber layer. In system 600, the partially-manufactured device additionally includes a substrate and a front contact. In system 601, the partially manufactured device additionally includes a back support and a back contact and may also include a substrate and front contact.

In system 600, before any non-transparent layers are formed in the solar device 20, the partially-manufactured solar device 20 is transferred to the measurement chamber 620 where the thickness of the device's window/emitter layer and the absorption wavelength of the device's absorber layer are determined. The window/emitter layer thickness and absorber layer absorption wavelength are determined using an illuminator 622 and detector 624, as explained above and illustrated in FIG. 4. Once the measurements have been taken for determining the solar device's window/emitter layer thickness and the absorber layer absorption wavelength, the solar device 20 is returned to its manufacturing process for formation of a back contact layer and a back support layer. This is illustrated in FIG. 6A by the movement of the solar device 20 through second solar device assembly facility 630. First and second solar device assembly facilities 610, 630 may be a single facility or may be separate facilities.

In system 601, after the window/emitter layer 230 is formed in the solar device 20 in the first solar device assembly facility 610 (and optionally after the front contact 210 and substrate 200 have been formed), the partially-manufactured solar device 20 is transferred to the measurement chamber 620 where the thickness of the device's window/emitter layer and the absorption wavelength of the device's absorber layer are determined. The window/emitter layer thickness and absorber layer absorption wavelength are determined using an illuminator 623 and detector 625. The illuminator 623 is configured to illuminate the solar device 20 while detector 625 is configured to detect light that is reflected from the various layers of the solar device 20. Once the measurements have been taken for determining the solar device's window/emitter layer thickness and the absorber layer absorption wavelength, the solar device 20 is returned to its manufacturing process, if necessary, for formation of a front contact layer and a substrate. First and second solar device assembly facilities 610, 630 may be a single facility or may be separate facilities.

In both systems 600, 601, after the solar device 20 is manufactured, the solar device 20 is introduced to a solar simulator 650 for testing. However, before the solar device 20 is introduced to the solar simulator 630, a processor 640 is used to determine the solar device's short-circuit current using the solar device's window/emitter layer thickness, the solar device's absorber layer absorption wavelength and a fitting parameter as inputs. The fitting parameter is generated by a fitting parameter generator device 660. The fitting parameter generating device 660 is configured to determine an absorption wavelength and short-circuit current for each of a first and second modified solar device and then use these to determine the fitting parameter according to equation 2 above. The first and second modified solar devices each have a substrate and a front contact that are materially and structurally the same as the substrate and front contact of solar device 20. However, the first and second modified solar devices each lack a window/emitter layer. Additionally, the first and second modified solar devices each have an absorber layer with different absorption wavelengths. Preferably, one of the modified solar devices has an absorber layer with a high absorption wavelength while the other has an absorber layer with a low absorption wavelength.

Once the processor 640 has determined a short-circuit current for the solar device 20 being manufactured, the determined short-circuit current is compared with the current compliance range of the solar simulator 650. If the determined short-circuit current exceeds the highest value in the current compliance range of the solar simulator 650, for example, the compliance of the solar simulator 650 is adjusted so that the solar device 20 may be tested in the solar simulator 650 without exceeding the solar simulator's compliance. As an example, adjustment of a solar simulator compliance may be effectuated by adjusting a load voltage for the simulator, thereby adjusting the current at which the I-V sweep begins.

The systems 600, 601 also include one or more data storage devices 670 to store generated data such as the determined window/emitter layer thickness and absorber layer absorption wavelength, the fitting parameters for various combinations of substrate layers and front contact layers, and lookup tables or other relational databases for relating transmissivity and other transmission properties to the measured data. The determined short-circuit current is also stored in the one or more data storage devices 670 for comparison with the solar simulator's compliance.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings, but is only limited by the scope of the appended claims.

What is claimed as new and desired to be protected by Letters Patent of the United States is:

1. A method of determining a short-circuit current for a solar device, the method comprising:
    determining a thickness of a window/emitter layer of the solar device before the device is fully assembled;
    determining an absorption wavelength of an absorber layer of the solar device before the solar device is fully assembled;
    determining a fitting parameter that indicates transmission properties of at least one transparent layer of the solar device; and
    using the determined window/emitter layer thickness, the determined absorber layer absorption wavelength and the determined fitting parameter to determine the short-circuit current for the solar device.

2. The method of claim 1, wherein the short-circuit current is determined before the solar device is fully assembled.

3. The method of claim 2, wherein the short-circuit current is determined before the solar device is tested using a solar simulator.

4. The method of claim 2, wherein the short-circuit current is determined before a back contact is formed on the solar device.

5. The method of claim 1, wherein determining the thickness of the solar device's window/emitter layer further comprises illuminating the device using light of a known wavelength.

6. The method of claim 5, wherein determining the thickness of the solar device's window/emitter layer further comprises illuminating the device using light with a wavelength between 450 and 550 nm.

7. The method of claim 5, wherein determining the thickness of the solar device's window/emitter layer further comprises using a detector to detect an amount of the illuminated light transmitted through the device.

8. The method of claim 7, further comprising comparing the detected amount of transmitted light with the amount of illuminated light to determine a ratio that indicates the transmissivity of the device's window/emitter layer at the known wavelength.

9. The method of claim 8, further comprising using a lookup table to determine the thickness of the device's window/emitter layer corresponding to the window/emitter layer's transmissivity at the known wavelength.

10. The method of claim 5, wherein determining the thickness of the solar device's window/emitter layer further comprises using a detector to detect an amount of the illuminated light reflected by the device.

11. The method of claim 10, further comprising comparing the detected amount of reflected light with the amount of illuminated light to determine a ratio that indicates the transmissivity of the device's window/emitter layer at the known wavelength.

12. The method of claim 1, wherein determining the absorption wavelength of the solar device's absorber layer further comprises illuminating the device using light of a plurality of known wavelengths.

13. The method of claim 12, wherein determining the absorption wavelength of the solar device's absorber layer further comprises using a detector to detect the amount of the illuminated light transmitted through or reflected by the solar device for each of the plurality of known wavelengths.

14. The method of claim 13, further comprising comparing the detected amount of transmitted light with the amount of illuminated light for each wavelength to determine a ratio that indicates the transmissivity of the device's absorber layer at each of the plurality of wavelengths, and creating a transparency-wavelength curve by plotting the determined transmissivity ratios against corresponding wavelengths.

15. The method of claim 14, wherein the absorber layer's absorption wavelength is an x-axis intercept of a tangent line to the transparency-wavelength curve at a point where a second derivative of the transparency-wavelength curve equals zero.

16. The method of claim 12, wherein determining the absorption wavelength of the solar device's absorber layer further comprises using a detector to detect an amount of the illuminated light reflected by the device for each of the plurality of known wavelengths.

17. The method of claim 16, further comprising comparing the detected amount of reflected light with the amount of illuminated light for each wavelength to determine a ratio that indicates the transmissivity of the device's absorber layer at each of the plurality of wavelengths.

18. The method of claim 1, wherein determining the fitting parameter that indicates transmission properties of the solar device's substrate and front contact layers further comprises determining an absorption wavelength and short-circuit current for each of a first and second modified solar devices, the first and second modified solar devices each having a substrate and a front contact that are materially and structurally the same as the solar device's substrate and front contact, the first and second modified solar devices each lacking a window/emitter layer, and the first and second modified solar devices each having an absorber layer with different absorption wavelengths.

19. The method of claim 18, further comprising using the absorption wavelengths and short-circuit currents of the first and second modified solar devices to determine a the fitting parameter for the solar device's substrate and front contact.

20. The method of claim 19, wherein the equation $Isc = a \times BE + d$ is used to determine the fitting parameter d of the solar device's substrate and front contact layers, where Isc is the short-circuit current of at least one of the first and second modified solar devices, BE is the absorption wavelength of the at least one of the first and second modified solar devices, and a is a coefficient.

21. The method of claim 1, wherein the equation $Isc = a \times BE + b \times Tcds + c \times Tcds \times BE + d$ is used to determine the solar device's short-circuit current Isc, where BE is the absorption wavelength for the solar device's absorber layer, Tcds is the thickness of the solar device's window/emitter layer, d is the fitting parameter for the solar device's substrate and front contact. and a, b and c are coefficients.

22. The method of claim 1, wherein the fitting parameter indicates at least one of transparency or reflection losses of the solar device's substrate and front contact layer combination.

* * * * *